[90.] 2 Sheets--Sheet 2.
LUKE CHAPMAN
Improved Rotary Pump.
119,011. Patented Sep. 19, 1871.
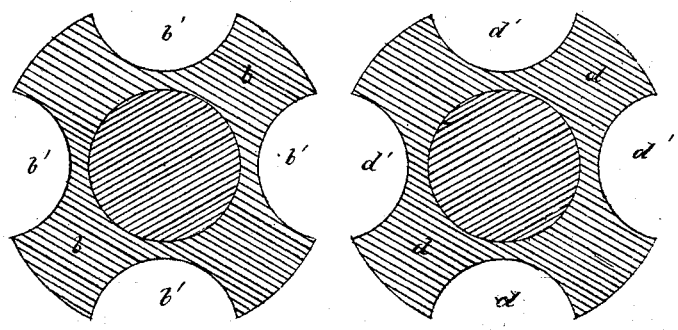
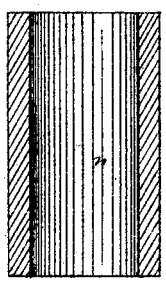
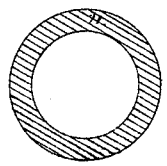
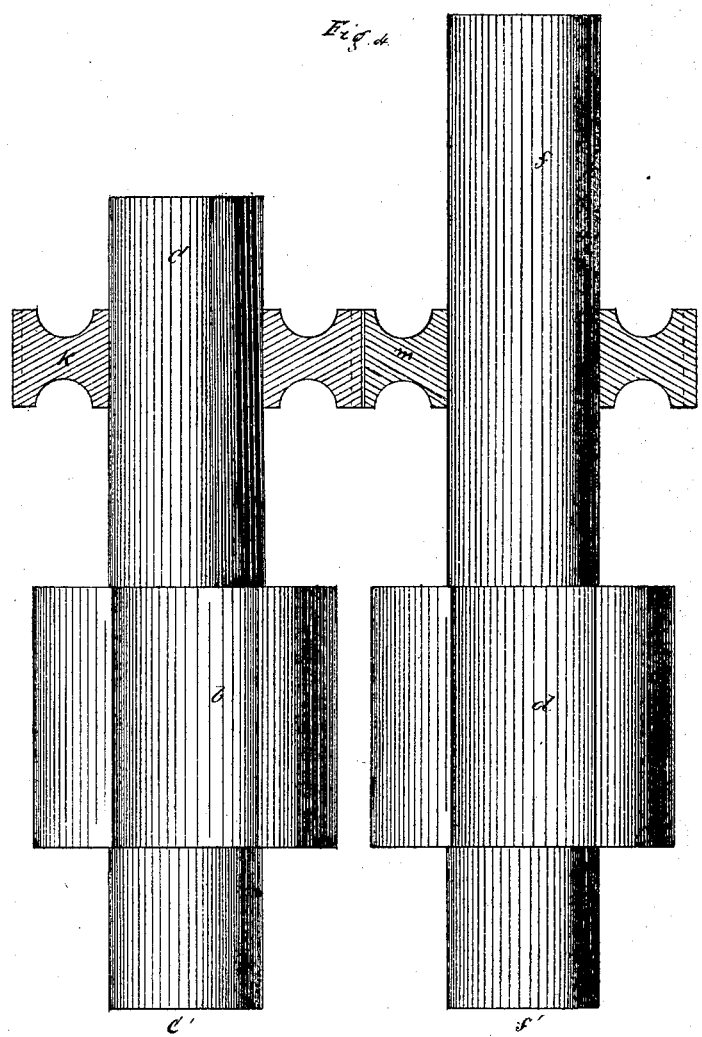
Witnesses. Inventor.

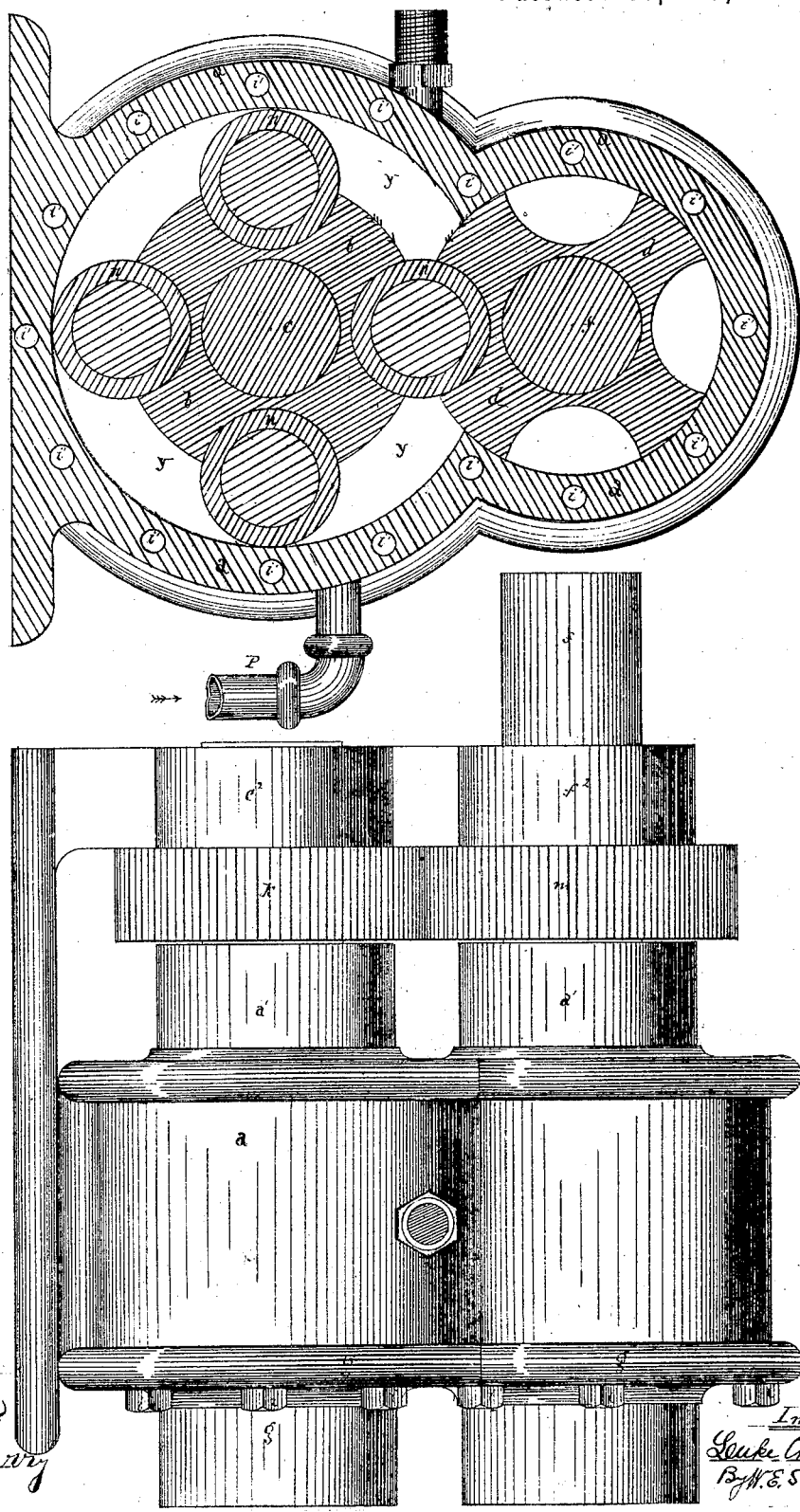

119,011

UNITED STATES PATENT OFFICE.

LUKE CHAPMAN, OF COLLINSVILLE, CONNECTICUT, ASSIGNOR TO HIMSELF AND W. J. WOOD, OF SAME PLACE.

IMPROVEMENT IN ROTARY PUMPS.

Specification forming part of Letters Patent No. 119,011, dated September 19, 1871.

*To all whom it may concern:*

Be it known that I, LUKE CHAPMAN, of Collinsville, in the county of Hartford and State of Connecticut, have invented an Improved Rotary Pump, equally useful as a motor or a meter, of which the following is a specification:

This invention, as its name indicates, is of the nature of a rotary pump, which will serve as a meter or a motor. All the parts, except the outer shell, revolve. The plunger revolves, the cut-off revolves, and the valves revolve. The valves— either solid or hollow cylinders — are carried around in semi-cylindrical grooves in the rotating plunger, and at each revolution of the rotating plunger each of these valves strikes into similar semi-cylindrical grooves in the periphery of the revolving cut-off. The objects of the invention are: First, to produce a rotary pump susceptible of any rate of speed, no matter how slow, no matter how fast. Second, to produce a rotary pump whose parts are so simple, strong, and durable as to always keep in order, and all the parts of which can be easily duplicated by the aid of common tools. Third, to produce a rotary pump in the working of which the friction of the parts is reduced to a minimum and that which remains is distributed over a large wearing-surface, so that the parts will not soon become injured or useless through such wear. Fourth, to produce a rotary pump which will not waste power or leak the fluid running through it. Fifth, to produce a rotary pump which shall be capable of discharging all its suction capacity. Sixth, to produce a rotary pump whose buckets or valves shall be of such shape, arrangement, and adjustment, and the operation of which shall be so contrived that the grit and sediment usually to be found in fluids shall be acted upon, forced, crushed, or otherwise removed by such valves without injury, delay, or detriment. It is intended to apply this invention to the working of any fluid.

Figure 1 is a side elevation, with one side removed so as to show the interior construction. Fig. 2 is a front elevation of the complete pump. Fig. 3 is a detached view of the two parts hereinafter known as the revolving plunger and revolving cut-off—a side view. Fig. 4 is a front view, detached, of the two parts shown in Fig. 3 attached to their respective shafts, upon which are shown in section the gear-wheels which make their revolutions synchronous. Fig. 5 is a longitudinal central section of one of the valves or buckets. Fig. 6 is a detached view of the exterior of a valve or bucket. Fig. 7 is an end view of a valve or bucket.

$a$ indicates the exterior shell of the pump. Within it are the revolving plunger $b$ rigidly fixed on the shaft $c$, and the revolving cut-off $d$ rigidly fixed on the shaft $f$. The respective ends of these shafts $c^1$ and $f^1$ turn in journals on the inner face of the removable side plate $g$. This side plate $g$ fastens to the shell $a$ by screw-bolts $i\ i$, &c., having threads cut upon them, and running into the screw-holes $i'\ i'$, &c. The side of the shell which is opposite the side-plate $g$ is in one piece with the body of the shell. On it are the projections $a'\ a'$, answering to like projections on the outer face of the side plate $g$. Into and through these projections $a'\ a'$ pass the shafts $c$ and $f$, made tight in passing through in any proper manner, as by stuffing-boxes or otherwise. On these shafts are rigidly fixed the gear-wheels $k$ and $m$, meshing into each other, which, being of the same size, avail to make the revolutions of the two shafts, and, of course, the plunger and cut-off, alike. $f$ is the driving-shaft. Both the shafts are supported in bearings $c^2$ and $f^2$, which are a part of the general frame of the machine. The plunger $b$ and the cut-off $d$ are solid cylinders of exactly the same size, revolving with exactly the same motion, albeit in different directions, and so placed with reference to each other that their peripheries would be in constant contact through their whole revolution were it not for the semi-cylindrical grooves in their surfaces made to embrace the valves $n\ n\ n\ n$, which are either solid or hollow cylinders, of rubber, metal, or other proper material, preferably hollow, made to fit into said grooves, which are, though not necessarily, four in number, in both the plunger and the cut-off, three of which, in Fig. 1, are seen as unfilled. In Fig. 3 the four grooves $b'\ b'\ b'\ b'$ are seen, as also are the four grooves $d'\ d'\ d'\ d'$. The arrows indicate the directions in which the plunger and cut-off rotate. The length of the plunger, cut-off, and valves is the same, and all just fill the shell of the pump from side to side or end to end. The semi-cylindrical grooves on the surface of the plunger $b$ are all of just the same size, and are, though not necessarily, equidistant from each other. The semi-cylindrical grooves on the cut-off are likewise all of the same size as those on the plunger, and are also the same distance apart as those on the plunger. The diameter of the valves is such as to fill the space from their semi-cylindrical seats in the revolving plunger to the inner circumference of the shell; and it is manifest that the diameter of the valves can be greatly varied, and that such change of diameter determines the capacity of the pump, it being understood, however, that any change in the diameter of the valves necessitates corresponding changes in the other parts of the pump.

Although I represent and prefer a certain number of valves equidistant from each other, it is manifest, and within the proper scope of my invention, that the semi-cylindrical grooves in the rotary plunger $b$ and cut-off $d$ may be regularly or irregularly placed on the periphery of both the plunger and cut-off, provided that the circular spaces between the grooves on the periphery of each correspond with each other and are relatively the same; for, since the diameters of the plunger and cut-off are the same, it is clear that their peripheries will continue in contact and separate at such intervals as the constructor may determine, and that such intervals may be easily predetermined and made the subject of adjustment.

The revolving cut-off $d$ completely fills the upper part of the shell. The water or other fluid enters through the inlet-pipe P and finds egress through the outlet-pipe $o$. The valves never part company with the plunger $b$. I deem it preferable to have the valves hollow for two reasons, viz., first, their weight is thereby diminished; and, second, the hollow space can be filled with tallow or other lubricating material when desired.

It will be readily understood that the valves will be constantly changing their positions in their seats, and thus presenting different wearing-surfaces; that the pump can without injury be run at any desired speed; that it will not leak from one valvular compartment to another, thus causing loss of power and efficiency and diminishing its capacity; that all the parts, being cylindrical, are capable of being turned up in a common lathe, thus doing away with any necessity for costly machinery in their manufacture, and also making all the working parts easy of duplication; that its action is almost noiseless; that the apparatus is readily susceptible of use as a motor and as a meter, and is adapted for use with steam and the like, as well as with heavier fluids.

I claim as my invention—

The combination, in a pump, of the following elements, *i. e.*, the revolving plunger $b$, the revolving cut-off $d$, and the cylindrical valves $n$, made loose in their sockets and free to revolve, as described.

LUKE CHAPMAN.

Witnesses:
　ALBERT L. THAYER,
　I. H. BIDWELL.　　　　　　　　　　　(90.)